(12) United States Patent
Sachter-Zeltzer et al.

(10) Patent No.: US 9,607,427 B2
(45) Date of Patent: Mar. 28, 2017

(54) COMPUTERIZED SYSTEMS AND METHODS FOR ANALYZING AND DETERMINING PROPERTIES OF VIRTUAL ENVIRONMENTS

(71) Applicant: Google Inc., Mountain View, CA (US)

(72) Inventors: Ariel Sachter-Zeltzer, Sunnyvale, CA (US); Christian Robertson, Pleasanton, CA (US); Jon Wiley, Mountain View, CA (US); John Nicholas Jitkoff, Kingsville, TX (US); Zachary Gibson, San Francisco, CA (US); David Haw Yun Chiu, Piedmont, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/748,847

(22) Filed: Jun. 24, 2015

(65) Prior Publication Data

US 2015/0371438 A1    Dec. 24, 2015

Related U.S. Application Data

(60) Provisional application No. 62/016,622, filed on Jun. 24, 2014.

(51) Int. Cl.
*G06T 15/20* (2011.01)
*H04N 13/00* (2006.01)
(Continued)

(52) U.S. Cl.
CPC ............. *G06T 15/20* (2013.01); *G06F 3/048* (2013.01); *G06T 15/205* (2013.01); *G06T 17/00* (2013.01);
(Continued)

(58) Field of Classification Search
CPC    G06T 13/00–13/80; G06T 3/00–3/608; G06T 11/00–11/80; G06T 15/00–15/87;
(Continued)

(56) References Cited

U.S. PATENT DOCUMENTS

| 8,760,489 B1 * | 6/2014 | Osher ................... H04N 7/148 348/14.01 |
| 2002/0198047 A1 * | 12/2002 | Hinami ................... A63F 13/10 463/32 |

(Continued)

OTHER PUBLICATIONS

European Patent Office, Notification of Transmittal of the International Search Report and the Written Opinion of the International Searching Authority, for related PCT Application No. PCT/US2015/037346, mailed on Nov. 9, 2015 (19 pages).

(Continued)

*Primary Examiner* — Daniel Hajnik
(74) *Attorney, Agent, or Firm* — Dority & Manning, P.A.

(57) ABSTRACT

Computer-implemented systems and methods are provided for analyzing and determining properties of virtual environments rendered on a display. The disclosed embodiments include, for example, a method for obtaining, by one or more processors, one or more depth parameters comprising one or more display parameters reflecting characteristics of the display, wherein the display parameters include a height and width of the display, and one or more environment depth multipliers reflecting a scaling factor to optimize display performance. The method may also include calculating, by the one or more processors, a diagonal display distance based on the display parameters. The method may also include calculating, by the one or more processors, an environment depth based on the diagonal display distance and the one or more environment depth multipliers. The (Continued)

method may also include setting, by the one or more processors, the depth of the display equal to the environment depth.

20 Claims, 11 Drawing Sheets

(51) Int. Cl.
*G06T 17/00* (2006.01)
*G06T 19/20* (2011.01)
*G06F 3/048* (2013.01)
*H04N 13/04* (2006.01)

(52) U.S. Cl.
CPC ......... *G06T 19/20* (2013.01); *H04N 13/0022* (2013.01); *H04N 13/0495* (2013.01); *G06T 2200/04* (2013.01); *G06T 2200/21* (2013.01); *G06T 2200/24* (2013.01); *G06T 2210/21* (2013.01); *G06T 2219/008* (2013.01); *G06T 2219/2021* (2013.01); *H04N 2213/007* (2013.01)

(58) Field of Classification Search
CPC ......... G06T 17/00–17/30; G06T 19/00–19/20; H04N 13/0022; H04N 13/0033; G06F 3/048–3/04897
See application file for complete search history.

(56) References Cited

U.S. PATENT DOCUMENTS

| | | | |
|---|---|---|---|
| 2004/0223218 A1 | 11/2004 | Putilin et al. | |
| 2010/0060575 A1* | 3/2010 | Ohta | A63F 13/10 345/158 |
| 2011/0122235 A1* | 5/2011 | Lee | H04N 13/0452 348/51 |
| 2012/0099836 A1* | 4/2012 | Welsh | H04N 13/004 386/230 |
| 2012/0200676 A1* | 8/2012 | Huitema | H04N 13/0022 348/51 |
| 2012/0223936 A1* | 9/2012 | Aughey | G06F 3/04815 345/419 |
| 2012/0320155 A1* | 12/2012 | Suh | H04N 13/0018 348/43 |
| 2013/0308917 A1 | 11/2013 | Nakamura | |
| 2014/0071236 A1* | 3/2014 | Tsukagoshi | H04N 13/0059 348/43 |
| 2014/0282055 A1* | 9/2014 | Engel | G06F 3/0482 715/744 |

OTHER PUBLICATIONS

European Patent Office, Invitation to Pay Additional Fees and, Where Applicable, Protest Fee, including Partial International Search, for related PCT Application No. PCT/US2015/037346, mailed on Sep. 3, 2015 (6 pages).

\* cited by examiner

COMPUTERIZED SYSTEMS AND METHODS FOR ANALYZING AND DETERMINING PROPERTIES OF VIRTUAL ENVIRONMENTS

CROSS-REFERENCE TO RELATED APPLICATION(S)

This application claims the benefit of U.S. Provisional Patent Application No. 62/016,622, filed Jun. 24, 2014, the contents of which are hereby incorporated by reference in their entirety.

BACKGROUND

The present disclosure generally relates to computerized systems and methods for displaying content to users. More particularly, and without limitation, the disclosed embodiments relate to systems and methods for determining properties of virtual environments, including virtual three-dimensional environments.

Today, graphical user interfaces reflect an important way for delivering content and information to users. In the modern digital age, users interact with these interfaces on a variety of devices, including computers, mobile phones, televisions, personal digital assistants, handheld systems, radios, music players, printers, tablets, kiosks, and other devices. Many conventional interfaces often display content to users in a two-dimensional manner.

SUMMARY

The disclosed embodiments include computerized systems and methods for analyzing and determining properties of virtual environments, including virtual three-dimensional interface environments.

The disclosed embodiments include systems and methods for analyzing and determining properties of virtual environments, including virtual three-dimensional interface environments. Aspects of the disclosed embodiments also provide methods and systems for determining properties of virtual environments to provide users with a consistent experience across various form factors, client devices, operating systems, and modes of operation.

The disclosed embodiments also include, for example, system for generating and rendering a virtual three-dimensional environment on a display associated with a client device. The system may include a memory storing a set of instructions and one or more processors configured to execute the set of instructions to perform one or more operations. The operations may include obtaining one or more depth parameters comprising one or more display parameters reflecting characteristics of the display, wherein the display parameters include a height and width of the display, and one or more environment depth multipliers reflecting a scaling factor to optimize display performance. The operations may also include determining a diagonal display distance based on the display parameters and determining an environment depth based on the diagonal display distance and the one or more environment depth multipliers. The operations may also include setting the depth of the display equal to the environment depth and rendering the virtual three-dimensional environment on the display in accordance with the environment depth such that the maximal apparent distance between rendered objects in the virtual three-dimensional environment does not exceed the environment depth.

The disclosed embodiments include, for example, a computer-implemented method comprising a plurality of operations performed by at least one processor. The operations of the method include obtaining one or more depth parameters comprising one or more display parameters reflecting characteristics of the display, wherein the display parameters include a height and width of the display, and one or more environment depth multipliers reflecting a scaling factor to optimize display performance. The method also includes determining a diagonal display distance based on the display parameters and determining an environment depth based on the diagonal display distance and the one or more environment depth multipliers. The method may also include setting the depth of the display equal to the environment depth and rendering the virtual three-dimensional environment on the display in accordance with the environment depth such that the maximal apparent distance between rendered objects in the virtual three-dimensional environment does not exceed the environment depth.

The disclosed embodiments also include, for example, system for generating and rendering a virtual three-dimensional environment on a display, the virtual three-dimensional environment associated with a virtual camera. The system may include a memory storing a set of instructions and one or more processors configured to execute the set of instructions to perform one or more operations. The operations may include obtaining one or more depth parameters, wherein the one or more depth parameters include: one or more display parameters reflecting characteristics of the display, and one or more camera parameters reflecting properties of the virtual camera, wherein the one or more camera properties include a camera type. The operations may also include determining a camera position process based on the one or more depth parameters and the one or more camera parameters. The operations may also include determining a camera position associated with the virtual camera based on the depth parameters and camera position process, the camera position including a camera height reflecting a height the virtual camera is located above the virtual three-dimensional environment in density-independent pixels. The operations may also include rendering the virtual three-dimensional environment on the display in accordance with the camera position.

The disclosed embodiments also include, for example, a computer-implemented method for generating and rendering a virtual three-dimensional environment on a display, the virtual three-dimensional environment associated with a virtual camera. The method may include obtaining one or more depth parameters, wherein the one or more depth parameters include: one or more display parameters reflecting characteristics of the display, and one or more camera parameters reflecting properties of the virtual camera, wherein the one or more camera properties include a camera type. The method may also include determining a camera position process based on the one or more depth parameters and the one or more camera parameters. The method may also include determining a camera position associated with the virtual camera based on the depth parameters and camera position process, the camera position including a camera height reflecting a height the virtual camera is located above the virtual three-dimensional environment in density-independent pixels. The method may also include rendering the virtual three-dimensional environment on the display in accordance with the camera position.

Additional objects and advantages of the disclosed embodiments will be set forth in part in the description that follows, and in part will be obvious from the description, or may be learned by practice of the disclosed embodiments. The objects and advantages of the disclosed embodiments will be realized and attained by means of the elements and combinations particularly pointed out in the appended claims.

It is to be understood that both the foregoing general description and the following detailed description are exemplary and explanatory only and are not restrictive of the disclosed embodiments as claimed.

The accompanying drawings constitute a part of this specification. The drawings illustrate several embodiments of the present disclosure and, together with the description, serve to explain the principles of the disclosed embodiments as set forth in the accompanying claims.

DETAILED DESCRIPTION OF THE EXAMPLE EMBODIMENTS

Reference will now be made in detail to embodiments of the present disclosure, examples of which are illustrated in the accompanying drawings. Where possible, the same reference numbers will be used throughout the drawings to refer to the same or like parts.

The disclosed embodiments relate to computer-implemented systems and methods that may determine depths, camera properties, and other features of virtual three-dimensional environments displayed on a device. In some aspects, the disclosed embodiments may determine these properties based on one or more parameters associated with the device, a component associated with the device (e.g., a display), virtual cameras associated with a virtual environment, accessibility considerations, and/or other information as disclosed herein. In certain aspects, the disclosed embodiments may implement these properties to provide virtual three-dimensional environments for an enhanced user experience over conventional two-dimensional environments. Furthermore, in some aspects, the disclosed embodiments may be implemented to provide consistent user experiences across the form factors of several client devices.

Determining depths of virtual environments, including virtual three-dimensional environments, may provide one or more advantages. For example, in virtual environments where casting shadows may be the primary cue for indicating object depth, it may prove advantageous to determine and control a maximum environment depth and/or height to provide consistent, normalized, and/or aesthetically pleasing cast shadows within the environment. In another example, controlling environment depth based on a number of parameters associated with the device (e.g., the device's physical width) or a display associated with the device (e.g., the display resolution, density, physical size, etc) may provide interfaces allowing for consistent user experiences across a variety of device and display form factors, sizes, and expected usages. For example, in one aspect, it may be advantageous to provide greater virtual environment depths for devices having a greater physical thickness (e.g., a CRT television) than thinner devices (e.g., a smartphone). In another aspect, it may prove advantageous to control the depth of a virtual environment based on an expected viewing distance associated with a device (e.g., a user viewing a television contrasted with a user viewing a tablet).

Figure 1:
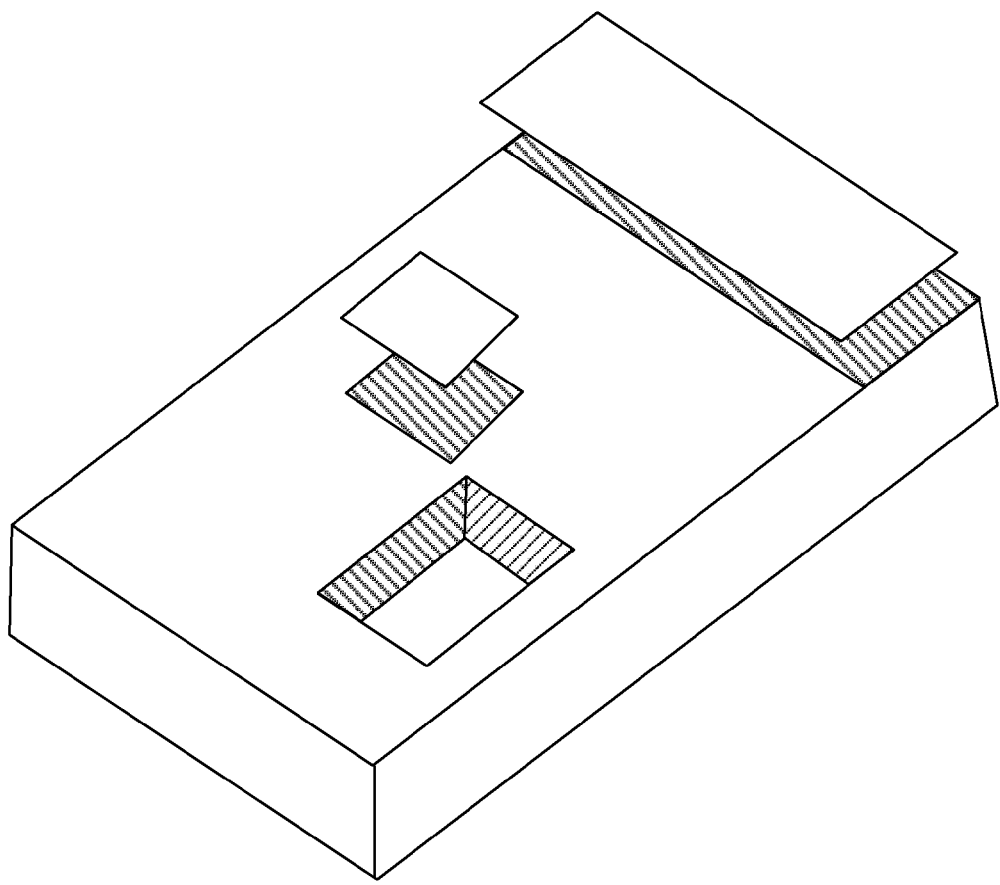
FIG. 1 depicts an example three-dimensional graphical user interface displayed on a client device, consistent with the disclosed embodiments.

FIG. 1 depicts an example three-dimensional graphical user interface displayed on a client device, consistent with the disclosed embodiments. In some aspects, a three-dimensional interface may differ from a conventional two-dimensional interface in that it permits objects to associate with height values. In certain embodiments, a three-dimensional virtual environment may be associated with an environment depth, reflecting the maximum apparent height differential any two rendered objects. In certain embodiments, a three-dimensional virtual environment may include a virtual camera for providing a perspective with which to view and render the three-dimensional environment. In some aspects, devices displaying such three-dimensional scenes may be configured to indicate the depths of objects via one or more processes consistent with the disclosed embodiments, such as cast shadows, occlusion, and the like.

Figure 2:
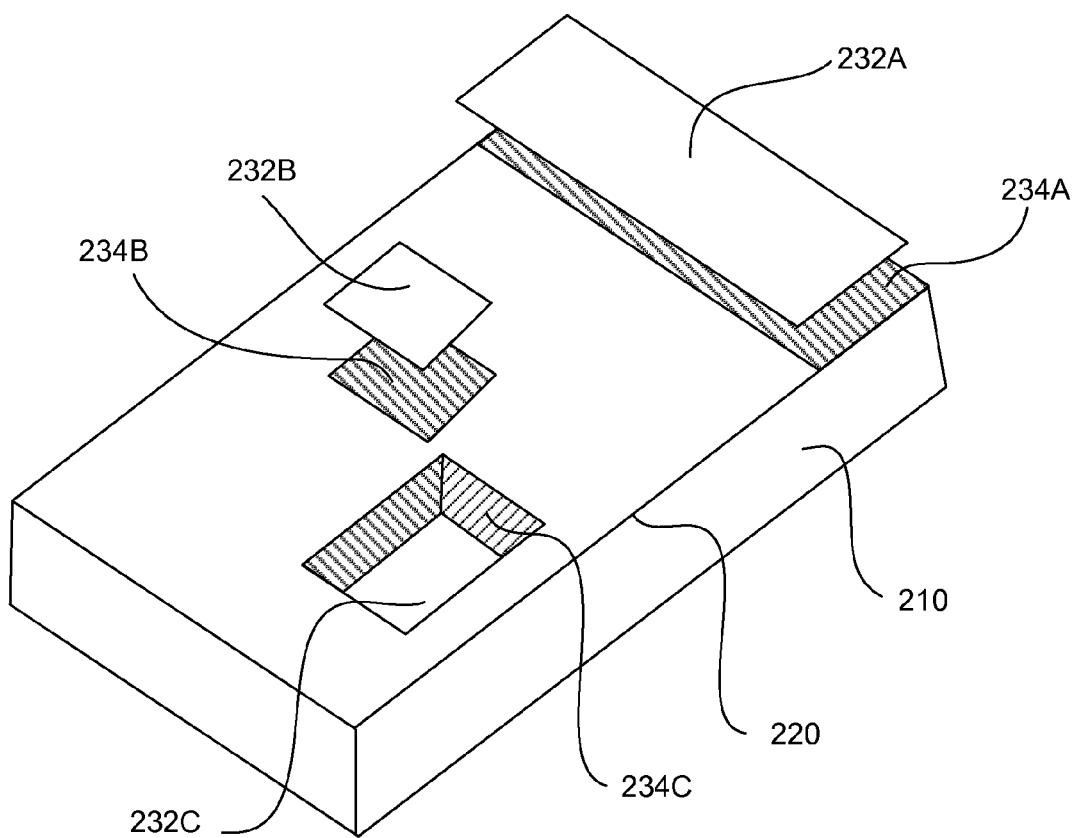
FIG. 2 depicts an example virtual three-dimensional graphical user interface displayed on a client device, consistent with the disclosed embodiments.

FIG. 2 depicts an example virtual three-dimensional graphical user interface displayed on a device, consistent with the disclosed embodiments. In certain aspects, the device (e.g., client device 210) may include, associate with, and/or interface with one or more displays (e.g., display 220) for displaying one or more interface objects (e.g., interface objects 232A, 232B, and 232C) to the user.

In some aspects, client device 210 may include any computing device, data processing device, or display device consistent with the disclosed embodiments. For example, device 210 may include a personal computer, a laptop computer, a tablet computer, a notebook computer, a handheld computer, a personal digital assistant, a portable navigation device, a mobile phone, a wearable device, an embedded device, a smartphone, a television, a stereoscopic display, a handheld gaming system, a digital radio, a music player (e.g., an iPod), a printer, a kiosks, and any additional or alternate computing device capable of processing information and providing information to a display. In certain aspects, client device 210 may be implemented with one or more processors, computer-based systems (e.g., the example device system of FIG. 11), or display systems (e.g., displays described in connection with display 220). In some aspects, client device 210 may include one or more client devices.

In certain embodiments, client device 210 may include, associate with, or interface with one or more displays 220. In some aspects, display 220 may comprise a display device or panel for portraying information. For example, display 220 may include one or more cathode ray tube (CRT) displays, liquid crystal displays (LCDs), plasma displays, light emitting diode (LED) displays, touch screen type displays, projector displays (e.g., images projected on a screen or surface, holographic images, etc), organic light emitting diode (OLED) displays, field emission displays (FEDs), active matrix displays, a vacuum fluorescent (VFR) displays, 3-dimensional (3-D) displays, electronic paper (e-ink) displays, microdisplays, or any combination of these displays. In some embodiments, display 220 may be included in client device 210. In other embodiments, display 220 may constitute a separate device communicating with client device 210 over a communications network (e.g., as discussed in connection with FIG. 11).

In certain aspects, device 210 may be configured to display a graphical user interface for providing data, information, pictures, videos, applications, windows, views, objects, etc, to a user. In some embodiments, the interface may include one or more interface objects (e.g., objects 232A, 232B, and/or 232C). In certain embodiments, an interface object may represent one or more items, units, or packages of information displayed on the interface. For example, an interface object (e.g., object 232A) may include an application window (e.g., windows associated with iOS, Microsoft Windows, Google Android, Apple OS X, another proprietary window, etc), a view, a button, a text box, an icon, a picture, a video, a field, a search field, a notification bar, or any other visual cue capable of providing information and/or receiving input.

In some aspects, device 210 may be configured to display one or more depth indicators (e.g., indicators 234A, 234B, and/or 234C) on display 220. In some embodiments, a depth indicator may reflect any pictorial or graphical indication of an apparent depth or height of a corresponding interface object. In certain embodiments, for example, a depth indicator may take the form of a cast or inward shadow signifying that the corresponding interface object sits above another or below in a virtual three-dimensional environment (e.g., as shown in connection with indicators 234A and 234B). In another example, a depth indicator may take another form, such as the sides of a virtual prism, box, or column (e.g., consistent with depth indicator 234C).

In certain aspects, a depth indicator may be configured to reflect relative heights and/or positions of interface objects in a virtual environment or scene. For example, a depth indicator may change its shape, size, color, intensity, opacity, gradient, saturation, brightness, etc, to indicate the relative position (or a change in the relative positions) of objects in the virtual environment. As shown in FIG. 2, for instance, depth indicator 234B may exhibit less occlusion than depth indicator 234A, signifying, for example, that interface object 232B sits above interface object 232A (e.g., has a greater relative height in the virtual environment). In some embodiments, processes implemented in client device 210 may be configured to change the relative heights of interface objects (e.g., change the nature and/or appearance of the corresponding depth indicators) in response to, for example, user input, system processes, received data, or other triggers consistent with the disclosed embodiments.

Figure 3:
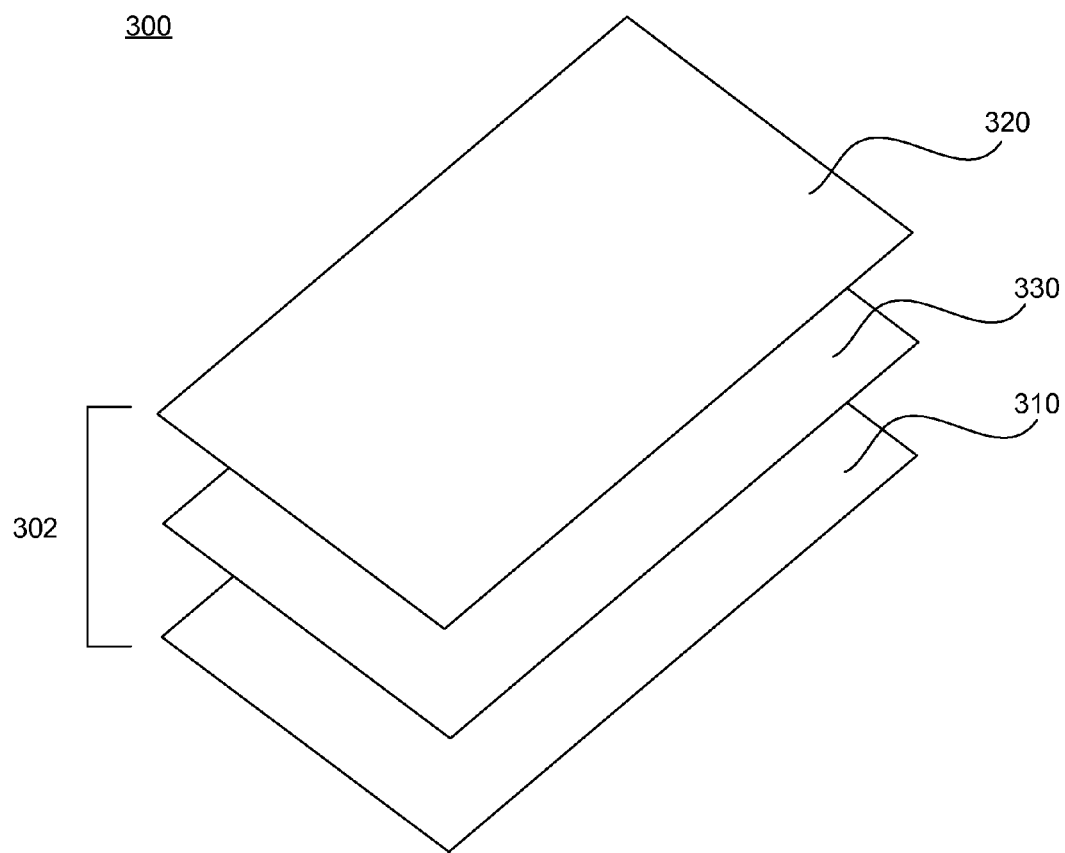
FIG. 3 depicts depth visualization of an example virtual three-dimensional environment, consistent with the disclosed embodiments.

FIG. 3 depicts a depth visualization of an example virtual three-dimensional environment, consistent with the disclosed embodiments. In some aspects, a three-dimensional environment may include a depth 302, representing a maximal apparent distance permitted between objects in the three-dimensional environment. In some embodiments, an apparent distance may reflect a quantitative difference in virtual height values. By way of illustrative example, a three-dimensional environment may include a ground plane 310, representing the lowest height an interface object may take in the three-dimensional environment. Similarly, the three-dimensional environment may include a screen plane 320, representing the highest height an interface object may take in the three-dimensional environment. The three-dimensional environment may also include one or more intermediate planes 330, reflecting any intermediate permitted height that an interface object may take. In these examples, the depth 302 of the three-dimensional environment may reflect the difference of the apparent distances between the screen plane 320 and the ground plane 310. Moreover, the use of the terms "ground plane," "screen plane," and "intermediate plane" are for illustrative purposes only and are not limiting or restrictive terms.

In some embodiments, depth 302 may be based on (e.g., calculated via processors included on client device 210) one or more parameters associated with client device 210, display 220, user preferences, accessibility considerations, and so on. In some aspects, for instance, depth 302 may be based on one or more display parameters reflecting characteristics of display 220. By way of example, the display parameters may include a display resolution (e.g., the height and/or width of the display in pixels), a display density (e.g., one or more densities of pixels within a unit distance or area), an average viewing distance associated with the display (e.g., an expected, mean, median, mode, or other statistical or predefined distance from which a user will view the display), a display size (e.g., the physical proportions or extents of the display), and/or the like.

In certain aspects, depth 302 may be based on one or more device parameters corresponding to characteristics of client device 210. For example, device parameters may include a device depth (e.g., the physical depth associated with device 210), a device type (e.g., television, smartphone, desktop monitor, tablet, etc, and/or any further disambiguation of such types such as a CRT display, LCD display, plasma display, etc), an operating system, and so on.

In certain embodiments, depth 302 may also be based on one or more accessibility parameters customizing a user experience with a three-dimensional environment. For example, in one aspect, the accessibility parameters may include a depth limit reflecting a maximal depth allowance. In some embodiments, for instance, the depth limit may be based on a device parameter (e.g., a device type), a display parameter (e.g., a display resolution), an absolute depth value, and the like. As another example, the accessibility parameters may include one or more user preferences customizing a user's experience with the three-dimensional environment. For example, in one aspect, user preferences may include a user depth multiplication factor that increases or decreases the apparent depths of objects, changes the nature and/or form of depth indicators (e.g., shape, color, etc), and the like. In some aspects, depth 302 may be calculated from other parameters (e.g., other depth parameters) consistent with the disclosed embodiments, such as absolute depth values (e.g., a fixed depth), multiplicative factors (e.g., an environment depth multiplier), etc, as disclosed herein.

Figure 4:
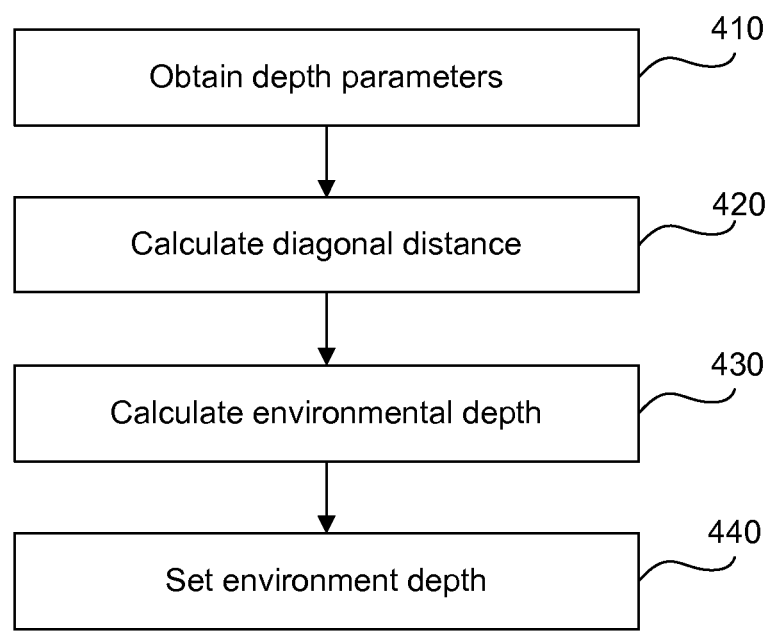
FIG. 4 depicts a flowchart of an example depth calculation process, consistent with the disclosed embodiments.

FIG. 4 depicts a flowchart of an example depth calculation process 400, consistent with the disclosed embodiments. In certain embodiments, process 400 may be implemented in a client device (e.g., client device 210) implementing one or more computing systems or processors (e.g., a device system 1100 of FIG. 11).

As shown in FIG. 4, process 400 may include obtaining one or more depth parameters consistent with the disclosed embodiments (step 410). In certain aspects, the depth parameters may include one or more display parameters, device parameters, accessibility parameters, or other parameters (e.g., an environment depth multiplier) as disclosed herein. For example, in one aspect, process 400 may include obtaining one or more display parameters such as a display resolution associated with display 220 (e.g., a height and/or width of display 220 in density-independent pixels). In certain embodiments, process 400 may obtain the depth parameters from systems associated with a client device 210 (e.g., memory, storage devices, other computing systems in connection or communication with the client device, etc).

In some embodiments, depth calculation process 400 may include calculating a diagonal display distance based in part on the obtained depth parameters (step 420). In certain aspects, the diagonal display distance may reflect the diagonal length of the display, represented in density-independent pixels. For example, in one aspect, the diagonal display distance may be calculated from a display resolution (e.g., a width and height of a display in density-independent pixels) in accordance with the following:

$$diagonalDisplayDistance = \sqrt{displayWidth^2 + displayHeight^2},$$

where displayWidth and displayHeight may correspond with the width and height display parameters in density-independent pixels.

In some aspects, depth calculation process 400 may include calculating an environment depth and applying corrections based on the obtained depth parameters, the diagonal display distance, and/or other factors consistent with the disclosed embodiments (step 430). In some embodiments, the environment depth may be based in part on the diagonal display distance derived from one or more display parameters (e.g., a display height and width in density-independent pixels). In certain aspects, the environment depth may also incorporate other depth parameters and variables consistent with the disclosed embodiments. In some embodiments, the environment depth may be expressed in units of density-independent pixels.

For example, in some aspects, an environment depth may be calculated based on the diagonal display distance and an environment depth multiplier. In certain embodiments, the environment depth multiplier may comprise any positive real number (e.g., 1.0, 0.15, $1/\pi$, etc) reflecting a desired scaling factor for the optimal environment depth (e.g., to optimize environment aesthetics, performance, experience, etc). In some aspects, the environment depth multiplier may be a constant for all calculated environment depths. For example, in one aspect, the environment depth multiplier may be constant for all devices, displays, etc. In other aspects, the environment depth multiplier may change based on one or more depth parameters. For example, in one embodiment, the environment depth multiplier may vary according to a device type (e.g., televisions generally, a class of televisions such as a CRT, wearable devices, desktop displays, etc), a particular device (e.g., a particularly thin smartphone), a display resolution (e.g., large displays), a display density, and so on.

In some aspects, process 430 may calculate an environment depth based on, for example, a calculated diagonal distance and an environment depth multiplier. For example, in one embodiment, the environment depth may be calculated from the product of the diagonal display distance and the environment depth multiplier:

environmentDepth=diagonalDisplayDistance·environmentDepthMultiplier.

In some aspects, environment depth calculation process 400 may incorporate one or more other depth parameters in its depth calculation routine. In some embodiments, these parameters may change, alter, or modify how process 400 calculates or corrects a calculated environment depth. For example, in certain embodiments, environment depth calculation process 400 may modify a calculated environment depth to fit within a certain range (e.g., a range in density-independent pixels), to account for a particular device type (e.g., increasing the calculated environment depth for a CRT television), to account for expected device usages (e.g., based on expected viewing distances from display 220), and the like. In one example, the obtained depth parameters may include a depth floor or ceiling preventing a calculated depth from falling below or exceeding a predefined number, respectively, regardless of a diagonal distance or device type, etc. In certain embodiments, environment depth calculation process 400 may include setting the depth of a scene to the calculated environment depth after all calculations and corrections have been applied (e.g., stored to memory, a storage device, transmitted to a computing system in connection with a client device 210 implementing process 400, etc) (step 440).

In one illustrative example, process 400 may obtain depth parameters associated with the width and height of a particular display 220. Process 400 may determine that width and height of the display are, for example, 1500 and 800 density-independent pixels, respectively. In some aspects, process 400 may calculate a diagonal distance based on the display resolution (e.g., 1700 pixels in this example). Process 400 may include obtaining a default or standard environmental depth multiplier with which to calculate an environmental depth (e.g., 0.15). In certain embodiments, process 400 may include obtaining device parameters (e.g., a device type). In some aspects, these device parameters may reflect that the client device 210 associated with display 220 requires a modified environmental depth (e.g., 0.2 to account, for instance, with a known thickness or expected use of the client device or display). In certain aspects, process 400 may calculate an environmental depth based on the diagonal distance and the (modified) environmental depth multiplier (e.g., 340 pixels=1700*0.2).

Continuing with the example process above, process 400 may further determine that the calculated environmental depth requires adjustments (e.g., it exceeds or falls below a maximum or minimum depth as defined in an accessibility parameter, etc). In some aspects, for example, process 400 may obtain an accessibility parameter reflecting that the client device 210 associated with display 220 may not produce a depth exceeding a certain number of density-independent pixels (e.g., 300 DIPs). In this example, for instance, process 400 may reduce the calculated environment depth for the three-dimensional environment to 300 density-independent pixels to comport with the obtained maximum depth. Consistent with the above procedures, process 400 may continue to refine, correct, and modify calculated environmental depths to deliver consistent user experiences across various devices, form factors, operating systems, expected device usages, and the like.

In some aspects, the disclosed embodiments may implement processes to render and manipulate virtual environments and objects (e.g., interface objects) included therein.

Figure 11:
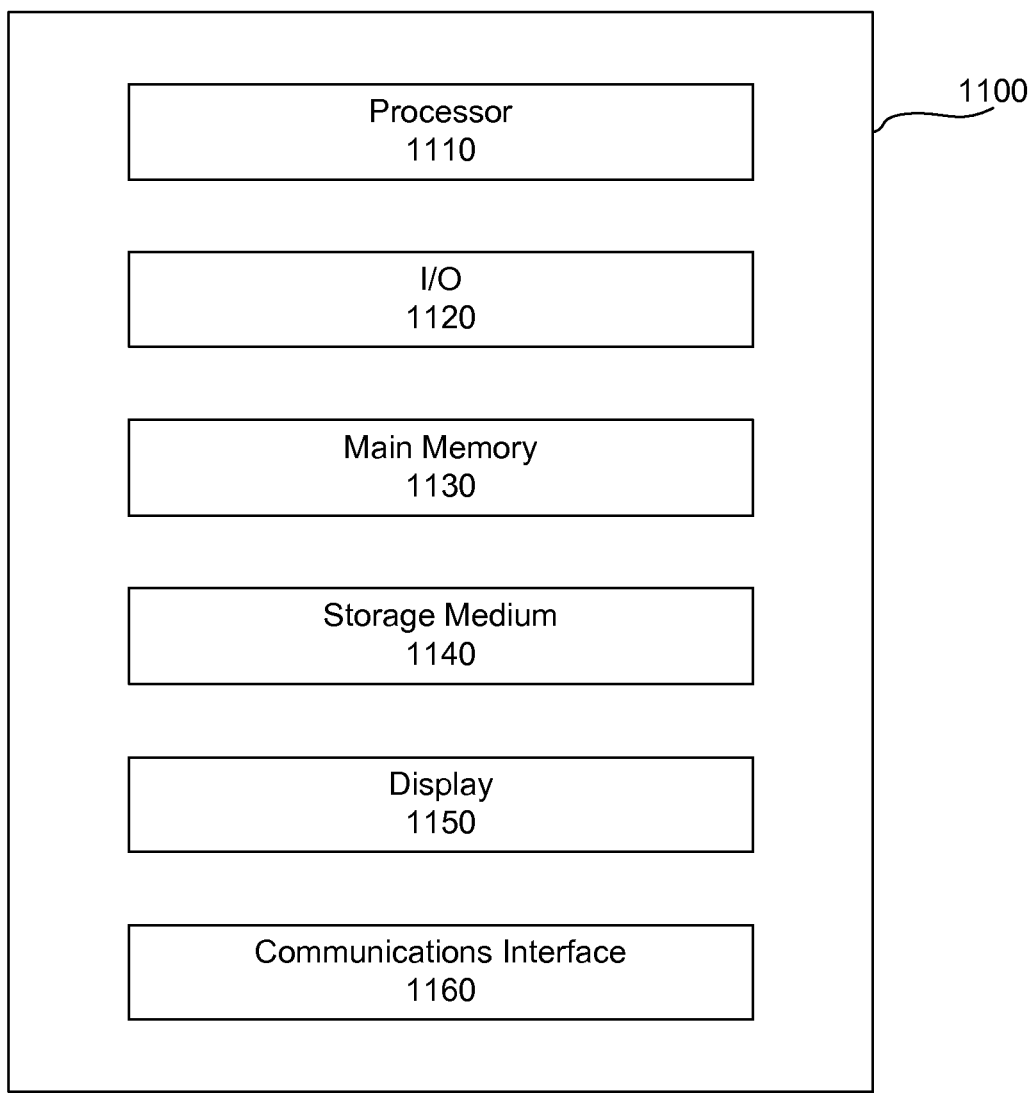
FIG. 11 depicts an example device system for implementing processes consistent with the disclosed embodiments.

For example, in one aspect, the disclosed embodiments may be implemented (e.g., in a client device 210 implementing one or more computing systems or processors, such as a device system 1100 of FIG. 11) to render a virtual three-dimensional environment on display 220. In some embodiments, client device 210 may perform processes to render the three-dimensional environment in accordance with a calculated environment depth. For example, client device 210 may be configured to render a virtual three-dimensional scene such that the maximal apparent distance between rendered interface objects is capped at the environment depth. In some aspects, client device 210 may be configured to ensure that a virtual height difference between two objects does not exceed the environment depth (or some factor of the environmental depth). For example, in one aspect, client device 210 may be configured to determine a virtual height difference between two objects (e.g., by comparing height values associated with the objects) and set the virtual height distance to the environment depth (or some factor thereof) if the determined height difference exceeds the environment depth (or some factor thereof).

The disclosed embodiments also include systems and methods for determining attributes of a virtual camera viewing, rendering, and portraying a displayed environment. In some embodiments, the virtual environment may be associated with a virtual camera reflecting, defining, and representing how objects (e.g., interface objects) in the environment are displayed to the user. In some aspects, the virtual camera may be associated with one or more camera parameters reflecting properties of the virtual camera. For example, in some embodiments, the one or more camera parameters may include a camera position (e.g., an x, y, and/or z position in Cartesian coordinates reflecting horizontal, vertical, and/or height position), a field of view, a camera type (e.g., orthographic, perspective, etc), and the like. In certain embodiments, the virtual camera may support different types of viewing systems, such as orthographic views, perspective views, etc.

Figure 5:
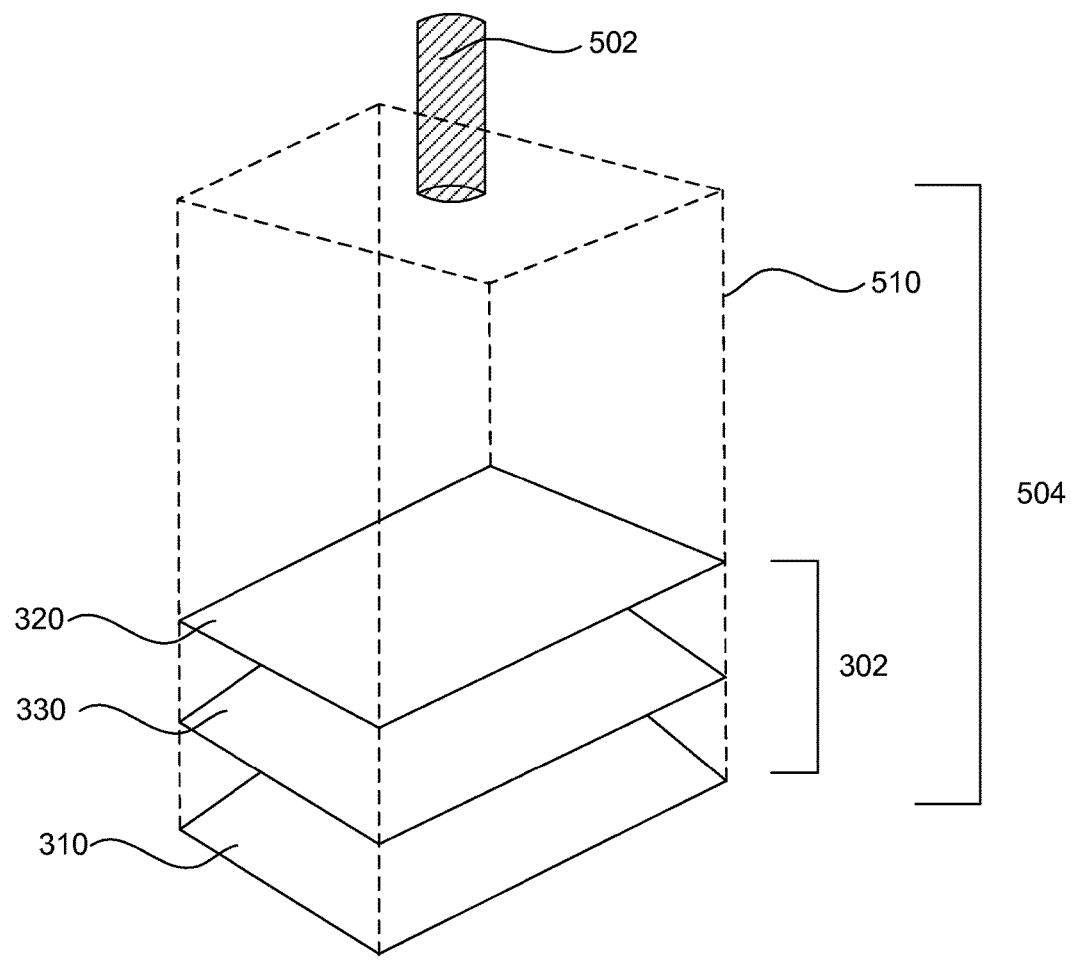
FIG. 5 depicts an example orthographic camera environment, consistent with the disclosed embodiments.

FIG. 5 depicts an example orthographic camera environment 500, consistent with the disclosed embodiments. Environment 500 may include one or more virtual cameras 502 configured to depict a virtual environment or scene (e.g., containing interface objects located on planes 310, 320, 330, any other intermediate planes, etc). The virtual scene may have a depth 302 (e.g., based on the difference between screen plane 320 and ground plane 310) determined via processes consistent with the disclosed embodiments. In some aspects, environment 500 may include a frustum 510 corresponding to the visible area of the virtual camera 502. In certain aspects, frustum 510 may be constrained by the corners of the display (e.g., the corners of planes 310, 320, and/or 330). Virtual camera 502 may be located a height 504 above the virtual environment. In some aspects, height 504 may be greater than the height of the highest object in the environment (e.g., an interface object located on screen plane 320).

Figure 6:
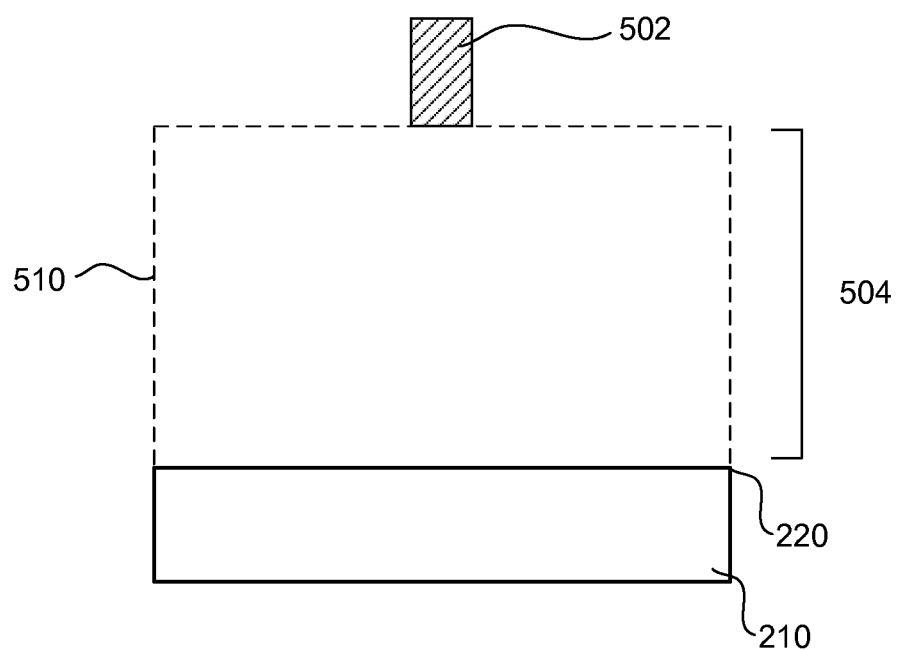
FIG. 6 depicts a cross-section of an example orthographic camera environment, consistent with the disclosed embodiments.

FIG. 6 depicts a cross-section of an example orthographic camera environment, consistent with the disclosed embodiments. In some aspects, virtual camera 502 may be located a height 504 above display 220 associated with client device 210. In certain embodiments, virtual camera 502 may be associated with a frustum 510 subtending a rectangular prism constrained by the boundaries of display 220. In some embodiments, for a given frustum 510, virtual camera 502 may be located at any point along the upper surface of the frustum (e.g., the rightmost or leftmost edges of frustum 510 into and out of the page, etc).

Figure 7:
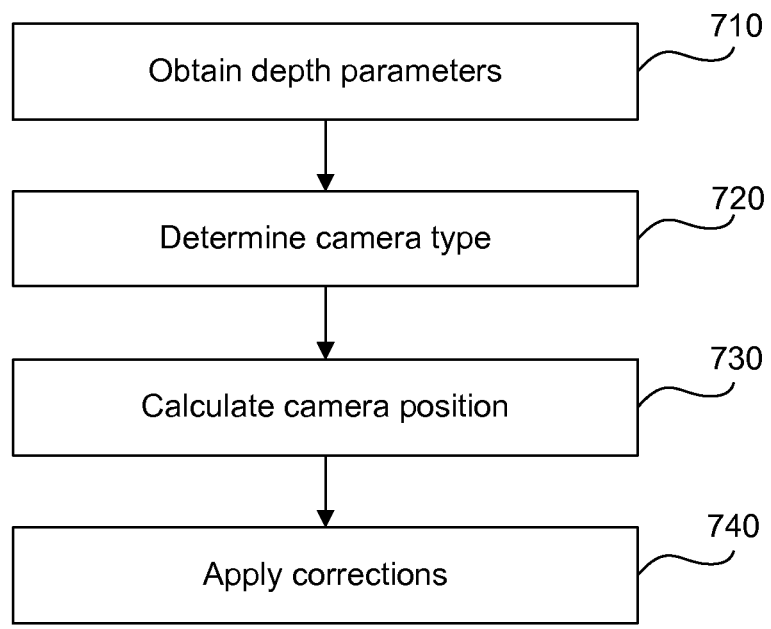
FIG. 7 depicts a flowchart of an example orthographic camera position calculation process, consistent with the disclosed embodiments.

FIG. 7 depicts a flowchart of an example orthographic camera position calculation process 700, consistent with the disclosed embodiments. In some aspects, process 700 may be implemented in a client device (e.g., client device 210) implementing one or more computing systems or processors (e.g., a device system 1100 of FIG. 11).

As shown in FIG. 7, process 700 may include obtaining one or more depth parameters in a manner consistent with the disclosed embodiments (step 710). For example, process 700 may be configured to obtain display parameters reflecting a display resolution of display 220, expected view distance associated with display 220, and so on. In one embodiment, for instance, process 700 may obtain display parameters reflecting the number of pixels spanning display 220, both horizontally and vertically. In certain embodiments, the obtained depth parameters may also include one or more camera parameters such as, for example, a camera type associated with virtual camera 502 (e.g., an orthographic camera type), a camera height 502 (e.g., in density-independent pixels), and the like.

In certain aspects, process 700 may include determining a camera position process for virtual camera 502 based on the obtained depth parameters (e.g., an obtained camera type) (step 720). Based on the obtained depth parameters and determined camera position process, process 700 may include calculating a camera position for virtual camera 502 (step 730). In some embodiments, for example, the camera position may correspond to the center of display 220 set a suitable height above the virtual environment. In this example, the camera position of virtual camera 502 may be given by the following coordinates:

$$cameraPosition = \left[\frac{numHorizontalPixels}{2}, \frac{numVerticalPixels}{2}, cameraHeight\right],$$

where numHorizontalPixels represents the number of density-independent pixels along the horizontal direction of display 220, numVerticalPixels represents the number of density-independent pixels along the vertical direction of display 220, and cameraHeight represents a height in density-independent pixels above display 220.

In other embodiments, virtual camera 502 may be located at any coordinate along the upper face of a given frustum (e.g., along a rectangle above the virtual environment at a given camera height 502). In this example, the camera position of virtual camera 502 may include any point within a rectangle with the following vertices:

$$cameraPosition \in \begin{cases} [0, 0, cameraHeight] \\ [0, numVerticalPixels, cameraHeight] \\ [numHorizontalPixels, 0, cameraHeight] \\ [numHorizontalPixels, numVerticalPixels, cameraHeight] \end{cases}$$

In certain embodiments, process 700 may modify, alter, or correct the calculated camera position based on the one or more obtained depth parameters, environment depth, or other values (step 740). For example, process 700 may be configured to determine the highest object in a virtual scene and set a camera height associated with virtual camera 502 to a value greater than the height of that object. In one embodiment, for instance, process 700 may include ensuring the following relationship holds, and modifying a calculated camera height if it does not:

cameraHeight>max{objectHeights}, where objectHeights represents the set of heights for all objects in a given virtual environment. In another embodiment, process 700 may determine that a virtual camera must be located above or below some other threshold height not related to the object heights (e.g., a maximum permitted camera height), must lie within a certain planar range (e.g., within the horizontal and vertical bounds of display 220), and change the camera position to accord with these parameters. Process 700, and other processes consistent with the disclosed embodiments, may then set the camera and a height and/or position consistent with the determined values to generate and render the three-dimensional environment accordingly.

Figure 8:
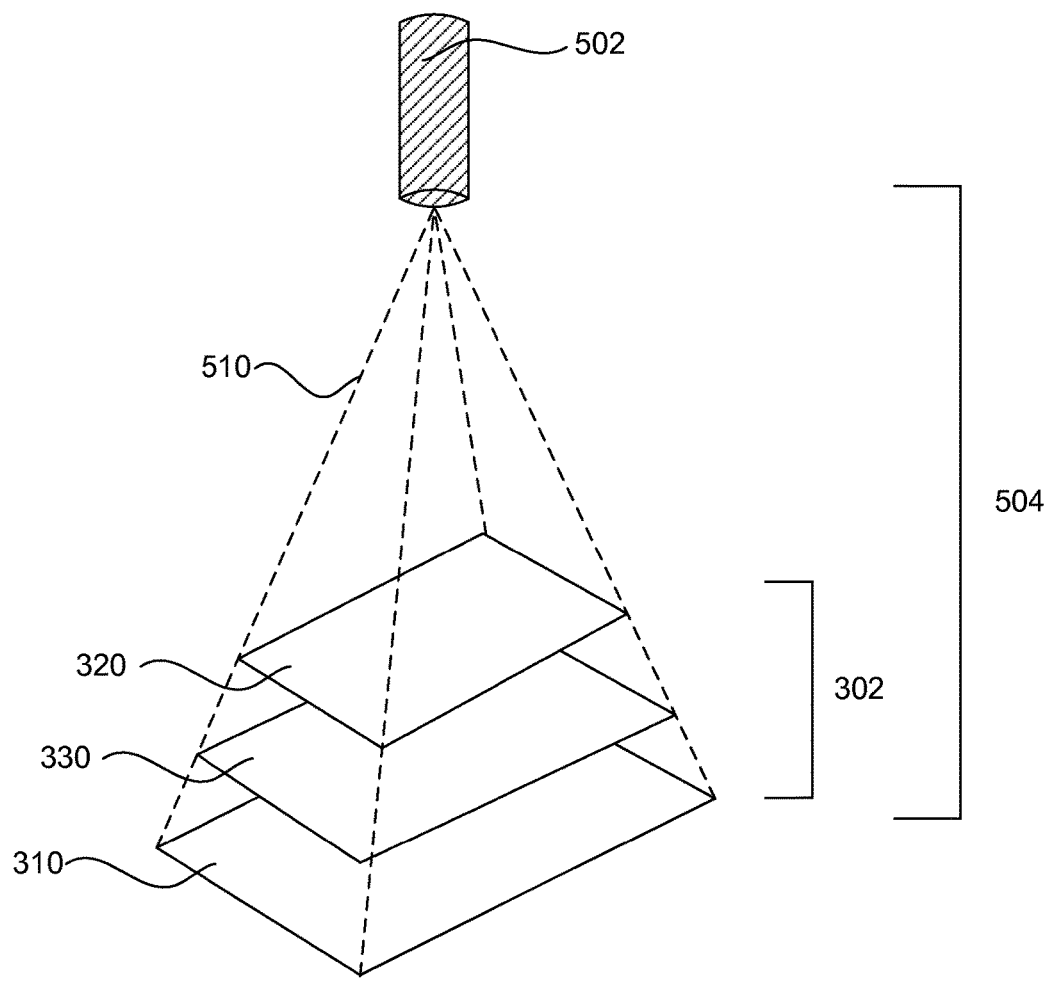
FIG. 8 depicts an example perspective camera environment, consistent with the disclosed embodiments.

FIG. 8 depicts an example perspective camera environment 800, consistent with the disclosed embodiments. Environment 800 may include one or more virtual cameras 502 configured to depict a virtual scene or environment. The virtual scene may be associated with a depth 302 (e.g., based on the difference in heights between screen plane 320 and ground plane 310) determined in a manner consistent with the disclosed embodiments. In some aspects, environment 500 may include a frustum 510 defining the visible area of virtual camera 502. In certain aspects, frustum 510 may be constrained by the corners of the display (e.g., the corners of planes 310, 320, and/or 330). In some aspects, the frustum 510 of virtual camera 502 associated with a perspective view may take the shape of a rectangular pyramid (e.g., as depicted in FIG. 8) instead of a rectangular prism (e.g., as depicted in connection with an orthographic camera in FIG. 5). In some embodiments, virtual camera 502 may be located a height 504 above the virtual environment.

Figure 9:
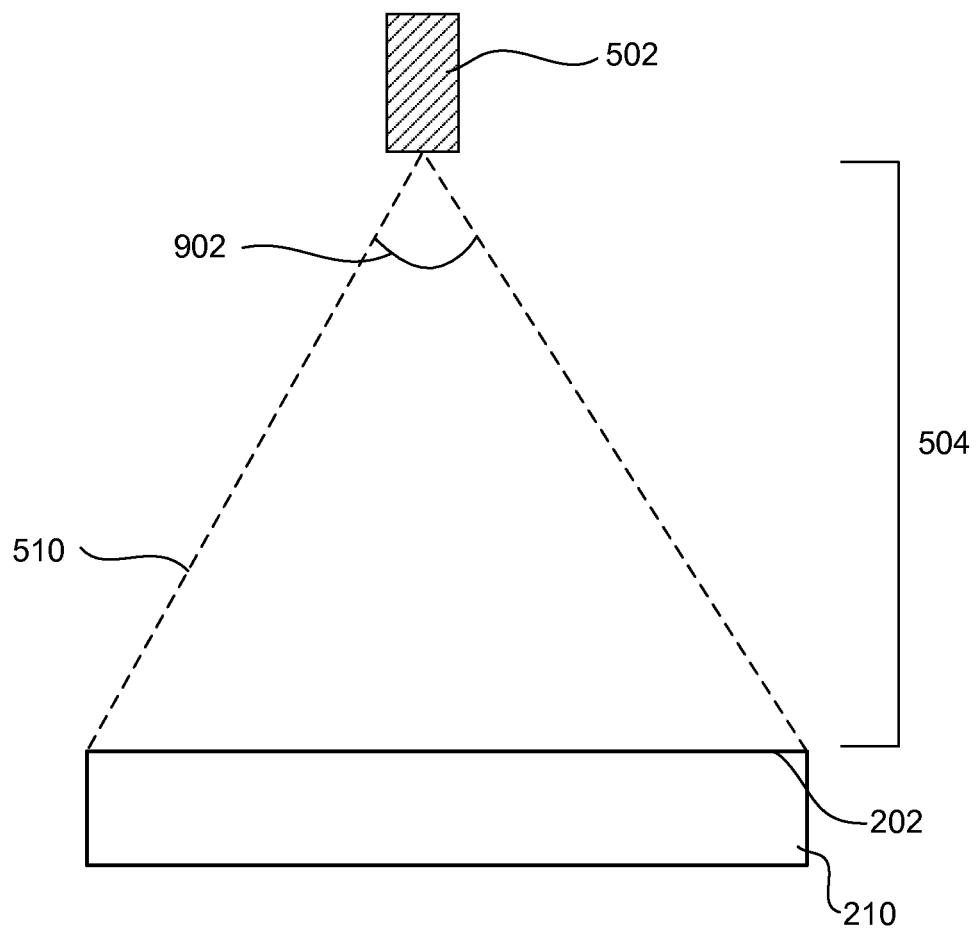
FIG. 9 depicts a cross-section of an example perspective camera environment, consistent with the disclosed embodiments.

FIG. 9 depicts a cross-section of an example perspective camera environment, consistent with the disclosed embodiments. In some aspects, virtual camera 502 may be located a height 504 above display 220 associated with client device 210. In certain embodiments, virtual camera 502 may be associated with a frustum 510 subtending a rectangular pyramid constrained by the boundaries of display 220 (e.g., as depicted in FIG. 9). In some embodiments, the shape of the frustum 510 may define a field of view (FOV) 902 associated with virtual camera 502 having a perspective camera type. In certain aspects, FOV 902 may represent the angle frustum 510 subtends between virtual camera 502 and the edges of display 220.

Figure 10:
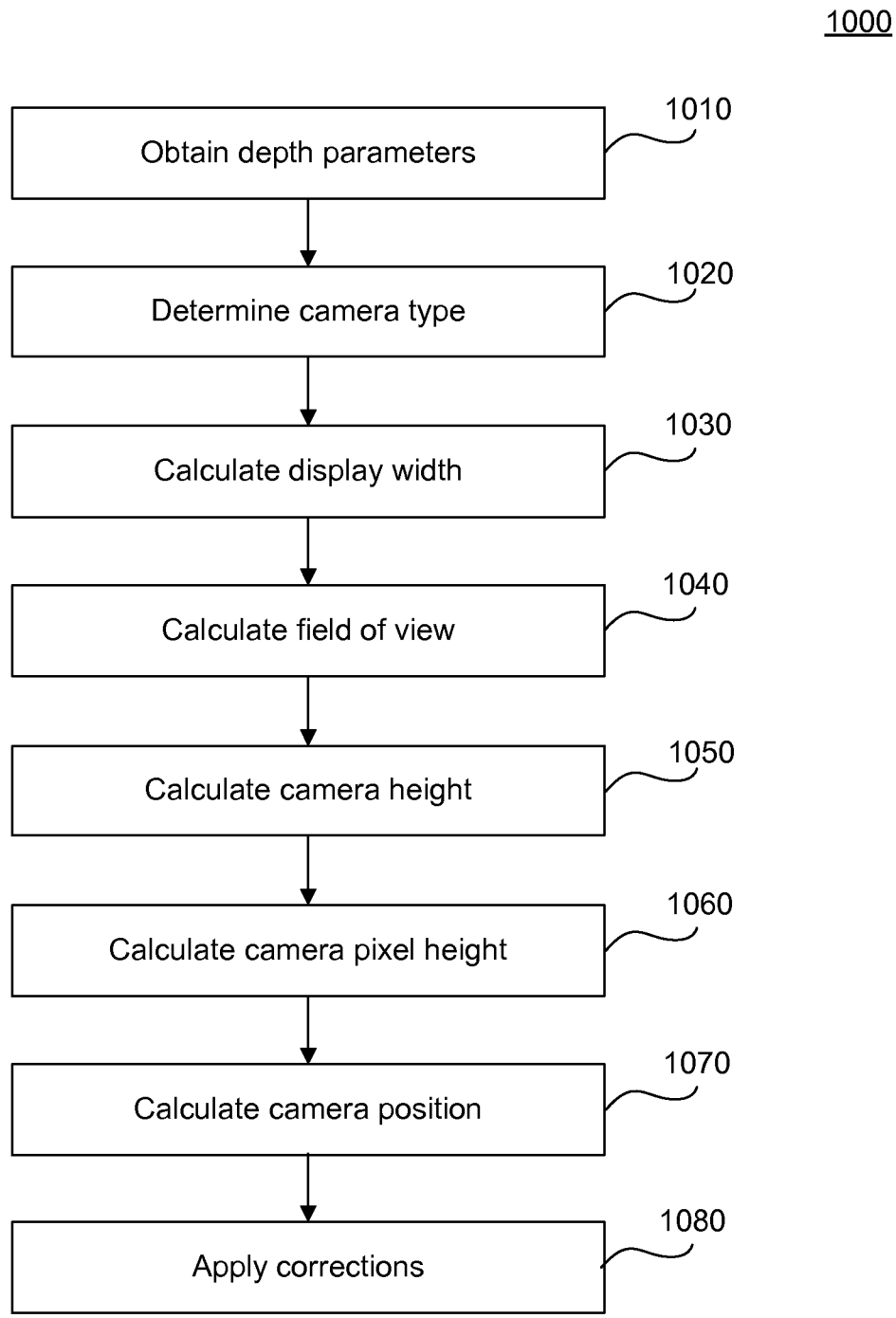
FIG. 10 depicts a flowchart of an example perspective camera position calculation process, consistent with the disclosed embodiments.

FIG. 10 depicts a flowchart of an example perspective camera position calculation process 1000, consistent with the disclosed embodiments. In some aspects, process 1000 may be implemented in a client device (e.g., client device 210) implementing one or more computing systems or processors (e.g., a device system 1100 of FIG. 11).

As illustrated in FIG. 10, process 1000 may include obtaining one or more depth parameters in a manner consistent with the disclosed embodiments (step 1010). In one aspect, for instance, process 1000 may include obtaining display parameters reflecting an average viewing distance, a display density, and a display resolution, or any component thereof (e.g., the number of horizontal pixels in the display 220). In certain embodiments, the obtained depth parameters may also include one or more camera parameters such as, for example, a camera type associated with virtual camera 502 (e.g., an perspective camera type), and the like. In some embodiments, the obtained depth parameters may include other parameters consistent with the disclosed embodiments such as device parameters and accessibility parameters as disclosed herein.

In certain aspects, process 1000 may include determining a camera position process for virtual camera 502 based on the obtained depth parameters (e.g., an obtained camera type) (step 1020). In certain embodiments, based on determining that virtual camera 502 corresponds to a perspective camera type (e.g., as opposed to another camera type such as an orthographic camera discussed in connection with FIG. 7), process 1000 may include calculating a display width reflecting the width of display 220 (step 1030). In certain aspects, process 1000 may calculate the display width based on the obtained depth parameters. For example, in one embodiment, process 1000 may include calculating the display width in accordance with the following:

$$displayWidth = \frac{numHorizontalPixels}{pixelDensity},$$

where displayWidth corresponds to the physical width of display 220, and pixelDensity corresponds to a density of pixels (e.g., pixels per unit length) in the direction of the display associated with displayWidth. In other embodiments, process 1000 may obtain the display width directly as a depth parameter (e.g., as a display or device parameter) without an intermediate calculation step.

In certain aspects, process 1000 may include calculating FOV 902 defining frustum 510 for virtual camera 502 (step 1040). In certain embodiments, process 1000 may calculate FOV 902 based on the obtained depth parameters. In one aspect, for instance, process 1000 may be configured to determine FOV 902 in accordance with the following:

$$FOV = 2 \cdot \arctan\left(\frac{displayWidth}{2 \cdot viewDistance}\right),$$

where viewDistance corresponds to an average, expected, median, mode, or other statistical or predetermined characteristic viewing distance for a particular form factor for display 220 (or client device 210), and FOV corresponds FOV 902. For example, a viewDistance associated with a television may be several meters, while a viewDistance associated with a smartphone display may be just over a foot.

As shown in FIG. 10, process 1000 may include determining a camera height for virtual camera 502 based on, for instance, a calculated display width and/or FOV 902 (step 1050). For example, in one aspect, process 1000 may determine a camera height in accordance with the following:

$$cameraHeight = \frac{displayWidth}{2 \cdot \tan(FOV/2)}.$$

where cameraHeight corresponds to the height of virtual camera 502 in units of distance. In other aspects, process 1000 may use other obtained depth parameters and/or values derived therefrom to determine a camera height. For example, in one embodiment, process 1000 may determine a camera height based on an expected view distance display parameter (e.g., a value representing viewDistance).

In certain aspects, process 1000 may include calculating a camera pixel height reflecting a height in pixels of virtual camera 502 (step 1060). In some embodiments, the camera pixel height of virtual camera 502 may be calculated based on obtained depth parameters and other calculated values. For example, in one embodiment, process 1000 may be configured to calculate the camera pixel height based on the camera height and pixel density in accordance with the following formula:

cameraHeightPixels=cameraHeight·pixelDensity, where cameraHeightPixels corresponds to the calculated camera height in pixels, and pixelDensity corresponds to density of pixels associated with display 220 (e.g., a density of pixels in the direction of the display associated with displayWidth, another direction, another value, etc).

In certain embodiments, process 1000 may include calculating a camera position for virtual camera 502 (step 1070). Process 1000 may calculate the camera position based on the obtained depth parameters and other calculated values consistent with process 1000. For example, in one aspect, process 1000 may calculate a camera position for virtual camera 502 in accordance with the following Cartesian coordinates:

$$cameraPosition = \left[\frac{numHorizontalPixels}{2}, \frac{numVerticalPixels}{2}, cameraHeightPixels\right]$$

where numHorizontalPixels represents the number of density-independent pixels along the horizontal direction of display 220, numVerticalPixels represents the number of density-independent pixels along the vertical direction of display 220, and cameraHeightPixels represents a height in density-independent pixels above display 220.

Process 1000 may also include modifying a calculated camera position or applying corrections to the calculated camera position (step 1080). For example, in an embodiment, process 1000 may include determining whether virtual camera 502 has a height exceeding the height of the highest object (e.g., an interface object) in a virtual environment. In this example, if process 1000 determines that the height of virtual camera 502 is less than the height of the highest object in the virtual environment, process 1000 may set the height of virtual camera 502 to a value exceeding the height of that object:

cameraHeightPixels>max{objectHeights}.

Process 1000 may include other corrections, modifications, additions, and alterations of the camera height consistent with the disclosed embodiments. In addition, process 1000 and other processes consistent with those disclosed herein may include setting the position of the virtual camera to the calculated position (or any such position or height consistent with the disclosed embodiments), and rendering a three dimensional environment in accordance with the camera position.

FIG. 11 depicts an example device system for implementing processes consistent with the disclosed embodiments, including the example systems and methods described herein. Device system 1100 may include one or more devices (e.g., device 210). The arrangement and number of components in device system 1100 is provided for purposes of illustration. Additional arrangements, number of components, or other modifications may be made, consistent with the disclosed embodiments.

Device system 1100 may include one or more processors 1110 for executing instructions. Processors suitable for the execution of instructions include, by way of example, both general and special purpose microprocessors, and any one or more processors of any kind of digital computer. A device system 1110 may also include one or more input/output (I/O) devices 1120. By way of example, I/O devices 1120 may include keys, buttons, mice, joysticks, styluses, gesture sensors (e.g., video cameras), motion sensors (e.g., infrared sensors, ultrasound sensors, etc), voice sensors (e.g., microphones), etc. Keys and/or buttons may be physical and/or virtual (e.g., provided on a touch screen interface).

Device system 1100 may include one or more storage devices configured to store data and/or software instructions used by processor(s) 1110 to perform operations consistent with disclosed embodiments. For example, a device system 1100 may include main memory 1130 configured to store one or more software programs that, when executed by processor(s) 1110, cause the processor(s) to perform functions or operations consistent with disclosed embodiments. By way of example, main memory 1130 may include NOR or NAND flash memory devices, read only memory (ROM) devices, random access memory (RAM) devices, etc. A device system 1100 may also include one or more storage medium(s) 1140. By way of example, storage medium(s) 1140 may include hard drives, solid state drives, tape drives, redundant array of independent disks (RAID) arrays, etc. Although FIG. 11 illustrates only one main memory 1130 and one storage medium 1140, a device system 1100 may include any number of main memories 1130 and storage mediums 1140. Further, although FIG. 11 illustrates main memory 1130 and storage medium 1140 as part of device system 1100, main memory 1130 and/or storage medium 1140 may be located remotely and device system 1100 may be able to access main memory 1130 and/or storage medium 1140 via a communication network (e.g., a LAN, a wireless LAN, a cellular network, an RF network, a Near Field Communication (NFC) network (e.g., a WiFi network), a wireless Metropolitan Area Network (MAN) connecting multiple wireless LANs, NFC communication link(s), any physical wired connection (e.g., via an I/O port), a WAN (e.g., the Internet), etc).

Storage medium(s) 1140 may be configured to store data, and may store data received from one or more of devices 210. The stored data may include any information consistent with the disclosed embodiments. For example, storage medium 1140 may be configured to store information associated with display parameters, device parameters, accessibility parameters, other parameters (an environment depth multiplier), any information derived therefrom (e.g., depths), any information including such parameters (e.g., lookup tables for device types, maximal depths), and the like.

Device system 1100 may also include one or more displays 1150 for displaying data and information. Display(s) 1150 may be implemented using one or more display panels, which may include, for example, one or more cathode ray tube (CRT) displays, liquid crystal displays (LCDs), plasma displays, light emitting diode (LED) displays, touch screen type displays, projector displays (e.g., images projected on a screen or surface, holographic images, etc), organic light emitting diode (OLED) displays, field emission displays (FEDs), active matrix displays, vacuum fluorescent (VFR)

displays, 3-dimensional (3-D) displays, electronic paper (e-ink) displays, microdisplays, or any combination of the above types of displays.

Device system 1100 may further include one or more communications interfaces 1160. Communications interface(s) 1160 may allow software and/or data to be transferred the device system 1100 and other systems. Examples of communications interface(s) 1160 may include modems, network interface cards (e.g., an Ethernet card), communications ports, personal computer memory card international association (PCMCIA) slots and cards, antennas, etc. Communications interface(s) 1160 may transfer software and/or data in the form of signals, which may be electronic, electromagnetic, optical, and/or other types of signals. The signals may be provided to and/or from communications interface(s) 1160 via a communications network, which may be implemented using wired, wireless, cable, fiber optic, radio frequency (RF), and/or other communications channels.

The disclosed embodiments are not limited to separate programs or computers configured to perform dedicated tasks. For example, a device 210 may include a main memory 1130 that stores a single program or multiple programs and may additionally execute one or more programs located remotely from another device, server, or computing system. In some aspects, display 220 may execute one or more remotely stored programs instead of, or in addition to, programs stored on these devices.

The computer-implemented methods disclosed herein may be executed, for example, by one or more processors that receive instructions from one or more non-transitory computer-readable storage mediums. Similarly, systems consistent with the present disclosure may include at least one processor and memory, and the memory may be a non-transitory computer-readable medium.

As used herein, a non-transitory computer-readable storage medium refers to any type of physical memory on which information or data readable by a processor may be stored. Examples include random access memory (RAM), read-only memory (ROM), volatile memory, nonvolatile memory, hard drives, CD ROMs, DVDs, flash drives, magnetic strip storage, semiconductor storage, optical disc storage, magneto-optical disc storage, and/or any other known physical storage medium. Singular terms, such as "memory" and "computer-readable storage medium," may additionally refer to multiple structures, such as a plurality of memories and/or computer-readable storage mediums.

As referred to herein, a "memory" may comprise any type of computer-readable storage medium unless otherwise specified. A computer-readable storage medium may store instructions for execution by one or more processors, including instructions for causing the one or more processors to perform steps or stages consistent with embodiments disclosed herein. Additionally, one or more computer-readable storage mediums may be utilized in implementing a computer-implemented method.

The foregoing description has been presented for purposes of illustration. It is not exhaustive and is not limited to precise forms or embodiments disclosed. Modifications and adaptations of the embodiments will be apparent from consideration of the specification and practice of the disclosed embodiments. For example, the described implementations include hardware and software, but systems and methods consistent with the present disclosure can be implemented as hardware alone.

Computer programs based on the written description and methods of this specification are within the skill of a software developer. The various programs or program modules can be created using a variety of programming techniques. For example, program sections or program modules can be designed in or by means of Java, C, C++, assembly language, or any such programming languages. One or more of such software sections or modules can be integrated into a device system or existing communications software.

Moreover, while illustrative embodiments have been described herein, it should be appreciated that the scope of this disclosure encompasses any and all embodiments having equivalent elements, modifications, omissions, combinations (e.g., of aspects across various embodiments), adaptations and/or alterations in view of the present disclosure. The elements in the claims are to be interpreted broadly based on the language employed in the claims and not limited to examples described in the present specification or during the prosecution of the application, which examples are to be construed as non-exclusive. Further, the steps of the disclosed methods can be modified in any manner, including reordering steps and/or inserting or deleting steps.

The many features and advantages of the disclosure are apparent from the detailed specification, and thus, it is intended that the appended claims cover all systems and methods, which fall within the true spirit and scope of the disclosure. As used herein, the indefinite articles "a" and "an" mean "one or more" in open-minded claims containing the transitional phrase "comprising," "including," and/or "having." Further, since numerous modifications and variations will readily occur to those skilled in the art, it is not desired to limit the disclosure to the exact construction and operation illustrated and described, and accordingly, all suitable modifications and equivalents may be resorted to, falling within the scope of the disclosure.

Other embodiments will be apparent to those skilled in the art from consideration of the specification and practice of the embodiments disclosed herein. It is intended that the specification and examples be considered as examples only, with a true scope and spirit of the disclosed embodiments being indicated by the following claims.

What is claimed:

1. A system for generating and rendering a virtual three-dimensional environment on a display associated with a client device, comprising:
   a memory storing a set of instructions; and
   one or more processors configured to execute the set of instructions to perform one or more operations, the operations comprising:
   obtaining a plurality of depth parameters, the depth parameters comprising:
      a plurality of display parameters reflecting characteristics of the display, wherein the display parameters include a height and a width of the display,
      one or more device parameters reflecting characteristics of the client device, wherein the device parameters include a device depth based on a physical depth of the client device, and
      one or more environment depth multipliers reflecting a scaling factor to optimize display performance, wherein the one or more environment depth multipliers are based on the device depth;
   determining a diagonal display distance based on the obtained display parameters;
   determining an environment depth based on the diagonal display distance and the one or more environment depth multipliers, the environment depth reflecting a maximal apparent distance permitted between objects in the virtual environment; and rendering the virtual three-dimensional environment on the display in accordance with the environment depth such that the maximal apparent distance between rendered objects in the virtual three-dimensional environment does not exceed the environment depth.

2. The system of claim 1, wherein:
the device parameters further include a device type;
at least one of the one or more environment depth multipliers is based on the one or more device parameters; and
the environment depth is based in part on the one or more device parameters.

3. The system of claim 2, wherein the operations further comprise obtaining one or more accessibility parameters customizing a user experience with the virtual environment, and wherein:
the accessibility parameters include at least one of a user preference or depth limit, the depth limit based on the device type; and
the environment depth is based in part on the one or more accessibility parameters.

4. The system of claim 1, wherein the operations further comprise:
determining whether a virtual height difference between a first interface object and a second interface object exceeds the environment depth;
modifying the virtual positions of the first interface object and the second interface object so that the virtual height distance does not exceed the environment depth; and
rendering the first interface object and the second interface object in accordance with the modifying.

5. The system of claim 1, wherein the virtual three-dimensional environment is associated with a virtual camera having a camera height reflecting a virtual distance between the virtual camera and the virtual three-dimensional environment, and wherein the operations further comprise providing instructions to the virtual camera to set the camera height to a value based on the depth parameters.

6. The system of claim 1, wherein the diagonal display distance is based on the height and the width of the display in density-independent pixels.

7. A computer-implemented method for generating and rendering a virtual three-dimensional environment on a display associated with a client device, the method comprising the following operations performed by one or more processors:
obtaining a plurality of depth parameters, the depth parameters comprising:
a plurality of display parameters reflecting characteristics of the display, wherein the display parameters include a height and a width of the display,
one or more device parameters reflecting characteristics of the client device, wherein the device parameters include a device depth based on a physical depth of the client device, and
one or more environment depth multipliers reflecting a scaling factor to optimize display performance, wherein the one or more environment depth multipliers are based on the device depth;
determining a diagonal display distance based on the obtained display parameters;
determining an environment depth based on the diagonal display distance and the one or more environment depth multipliers, the environment depth reflecting a maximal apparent distance permitted between objects in the virtual environment; and
rendering the virtual three-dimensional environment on the display in accordance with the environment depth such that the maximal apparent distance between rendered objects in the virtual three-dimensional environment does not exceed the environment depth.

8. The computer-implemented method of claim 7, wherein:
the device parameters further include a device type;
at least one of the one or more environment depth multipliers is based on the one or more device parameters; and
the environment depth is based in part on the one or more device parameters.

9. The computer-implemented method of claim 8, wherein the operations further comprise obtaining one or more accessibility parameters customizing a user experience with the virtual environment, and wherein:
the accessibility parameters include at least one of a user preference or depth limit, the depth limit based on the device type; and
the environment depth is based in part on the one or more accessibility parameters.

10. The computer-implemented method of claim 7, wherein the operations further comprise:
determining whether a virtual height difference between a first interface object and a second interface object exceeds the environment depth;
modifying the virtual positions of the first interface object and the second interface object so that the virtual height distance does not exceed the environment depth; and
rendering the first interface object and the second interface object in accordance with the modifying.

11. The computer-implemented method of claim 7, wherein the virtual three-dimensional environment is associated with a virtual camera having a camera height reflecting a virtual distance between the virtual camera and the virtual three-dimensional environment, and wherein the operations further comprise providing instructions to the virtual camera to set the camera height to a value based on the depth parameters.

12. The computer-implemented method of claim 7, wherein the diagonal display distance is based on the height and the width of the display in density-independent pixels.

13. A system for generating and rendering a virtual three-dimensional environment on a display associated with a client device, the virtual three-dimensional environment associated with a virtual camera, the system comprising:
a memory storing a set of instructions; and
one or more processors configured to execute the set of instructions to perform one or more operations, the operations comprising:
obtaining a plurality of depth parameters, the depth parameters comprising:
one or more display parameters reflecting characteristics of the display,
one or more device parameters reflecting characteristics of the client device, wherein the device parameters include a device depth based on a physical depth of the client device, and
one or more camera parameters reflecting properties of the virtual camera, wherein the one or more camera properties include a camera type;
determining a camera position process based on the depth parameters;
determining a camera position associated with the virtual camera based on the depth parameters and camera position process, the camera position including a camera height reflecting a height the virtual camera is located above the virtual three-dimensional environment in density-independent pixels;

determining an environment depth based at least on the device depth; and rendering the virtual three-dimensional environment on the display in accordance with the environment depth and the camera position and the environment depth.

14. The system of claim 13, wherein the one or more display parameters include at least two of:
   a horizontal number of pixels in a first direction along the display;
   a vertical number of pixels in a second direction along the display;
   a pixel density associated with the display; and
   a view distance associated with the display, the view distance reflecting an characteristic viewing distance associated with the display; and
   wherein the camera type includes at least one of an orthographic camera or perspective camera.

15. The system of claim 14, wherein the operations further comprise:
   determining a field of view associated with the virtual camera based on the one or more display parameters, the field of view defining a frustum subtended by the display and the virtual camera;
   determining a camera height distance associated with the virtual camera based on the field of view and the one or more display parameters, the camera height distance reflecting a height of the virtual camera in units of distance; and
   setting the camera height associated with the virtual camera based on the one or more display parameters and the camera height distance; and
   rendering the three-dimensional environment based on the camera height.

16. The system of claim 15, wherein the operations further comprise:
   determining a maximum object height corresponding to a highest height value associated with an interface object displayed on the display;
   determining whether the camera height associated with the camera position exceeds the maximum object height; and
   setting the camera height to a value greater than the maximum object height when the camera height does not exceed the maximum object height.

17. The system of claim 13, wherein:
   the one or more device parameters further include a device type of the client device;
   the depth parameters include
      one or more accessibility parameters customizing a user experience with the virtual three-dimensional environment, the accessibility parameters including a user preference; and
   the camera position is based in part on the one or more device parameters and the one or more accessibility parameters.

18. A computer-implemented method for generating and rendering a virtual three-dimensional environment on a display associated with a client device, the virtual three-dimensional environment associated with a virtual camera, the method comprising the following operations performed on one or more processors:
   obtaining a plurality of depth parameters, the depth parameters comprising:
      one or more display parameters reflecting characteristics of the display,
      one or more device parameters reflecting characteristics of the client device, wherein the device parameters include a device depth based on a physical depth of the client device, and
      one or more camera parameters reflecting properties of the virtual camera, wherein the one or more camera properties include a camera type;
   determining a camera position process based on the depth parameters;
   determining a camera position associated with the virtual camera based on the depth parameters and camera position process, the camera position including a camera height reflecting a height the virtual camera is located above the virtual three-dimensional environment in density-independent pixels;
   determining an environment depth based at least on the device depth; and
   rendering the virtual three-dimensional environment on the display in accordance with the camera position and the environment depth.

19. The computer-implemented method of claim 18, wherein:
   the one or more display parameters include at least two of:
      a horizontal number of pixels in a first direction along the display;
      a vertical number of pixels in a second direction along the display;
      a pixel density associated with the display; and
      a view distance associated with the display, the view distance reflecting an characteristic viewing distance associated with the display;
   the camera type includes at least one of an orthographic camera or perspective camera;
   the one or more device parameters further include a device type of the client device;
   the depth parameters include;
      one or more accessibility parameters customizing a user experience with the virtual three-dimensional environment, the accessibility parameters including a user preference; and
   the camera position is based in part on the one or more device parameters and the one or more accessibility parameters.

20. The computer-implemented method of claim 19, wherein the operations further comprise:
   determining a field of view associated with the virtual camera based on the one or more display parameters, the field of view defining a frustum subtended by the display and the virtual camera;
   determining a camera height distance associated with the virtual camera based on the field of view and the one or more display parameters, the camera height distance reflecting a height of the virtual camera in units of distance; and
   setting the camera height associated with the virtual camera based on the one or more display parameters and the camera height distance; and
   rendering the three-dimensional environment based on the camera height.

* * * * *